US010433304B2

United States Patent
Rison et al.

(10) Patent No.: US 10,433,304 B2
(45) Date of Patent: Oct. 1, 2019

(54) METHOD OF DEDICATING FREQUENCY CHANNEL FOR PROBING OR FOR DATA

(71) Applicant: Samsung Electronics Co., Ltd., Gyeonggi-do (KR)

(72) Inventors: Mark G. Rison, Cambridge (GB); Timothy J. Chick, Bedford (GB)

(73) Assignee: Samsung Electronics Co., Ltd (KR)

( * ) Notice: Subject to any disclaimer, the term of this patent is extended or adjusted under 35 U.S.C. 154(b) by 225 days.

(21) Appl. No.: 15/096,853

(22) Filed: Apr. 12, 2016

(65) Prior Publication Data
US 2017/0295575 A1    Oct. 12, 2017

(51) Int. Cl.
*H04W 4/00* (2018.01)
*H04W 72/04* (2009.01)
*H04L 5/00* (2006.01)
*H04W 84/12* (2009.01)

(52) U.S. Cl.
CPC ....... *H04W 72/0453* (2013.01); *H04L 5/0048* (2013.01); *H04W 84/12* (2013.01)

(58) Field of Classification Search
CPC .......... H04L 5/0048; H04W 72/0453
See application file for complete search history.

(56) References Cited

U.S. PATENT DOCUMENTS

| | | | | |
|---|---|---|---|---|
| 2007/0014267 A1* | 1/2007 | Lam | ..................... | H04W 48/10 370/338 |
| 2011/0235591 A1* | 9/2011 | Iyer | ..................... | H04L 5/0064 370/328 |
| 2013/0194962 A1* | 8/2013 | Abraham | .............. | H04W 8/005 370/254 |
| 2013/0235823 A1* | 9/2013 | Kneckt | ................. | H04W 72/02 370/329 |
| 2014/0177548 A1* | 6/2014 | Aihara | ................. | H04W 72/02 370/329 |
| 2014/0269468 A1* | 9/2014 | Jia | ......................... | H04W 24/02 370/311 |
| 2015/0282064 A1* | 10/2015 | Patil | ..................... | H04W 48/20 370/329 |

* cited by examiner

*Primary Examiner* — Bo Hui A Zhu
(74) *Attorney, Agent, or Firm* — The Farrell Law Firm, P.C.

(57) ABSTRACT

A method is presented for dedicating and allocating frequency channels to control and data frames in a WiFi local area network system. The method comprising dedicating a frequency channel in a frequency band, determining by a station the dedicated frequency channel, transmitting by the station a probe request frame in the dedicated frequency channel, receiving by the station a probe response frame in the dedicated frequency channel.

13 Claims, 4 Drawing Sheets

METHOD OF DEDICATING FREQUENCY CHANNEL FOR PROBING OR FOR DATA

BACKGROUND

1. Field of the Disclosure

The present disclosure generally relates to increasing bandwidth and efficiency in a Wireless Fidelity (WiFi) local area network system, and more particularly, to a method for allocating a frequency channel to data frames and dedicating a separate frequency channel for probe request frames and probe response frames in a WiFi local area network system.

2. Description of the Related Art

Mobile wireless communication devices contain multiple wireless communication radios designed for various bandwidths, coverage areas, latencies and applications. The increasing number of users of wireless communication devices and the increasing bandwidth demands of users of those devices has created challenges in the efficient coordination of control and data frame transmissions and connection procedures. In particular, cases in which many users are attempting to simultaneously connect to a network through WiFi Access Points (AP) create a surge in control frequency channel traffic as each WiFi station (such as a wireless communication device) is attempting to connect to the network through the access point. The surge in frequency of control channel traffic reduces the data traffic on any particular frequency channel decreasing the data bandwidth to users, and as a result the user's satisfaction with the service. The frequency of control channel traffic caused by transmitting probe request frames from stations to the AP and the probe response frames transmitted from the AP to the stations are a primary source of the control traffic congestion. As the users of wireless communication devices increase demand for lower latencies and higher bandwidths in the network access service there is a need to increase the efficiency of the WiFi access networks.

SUMMARY

The present disclosure has been made to address the above problems and disadvantages and to provide at least the advantages described below.

According to an aspect of the present disclosure, a method for wireless communication is presented, the method comprising dedicating a frequency channel in a frequency band, determining by a station the dedicated frequency channel, transmitting by the station a probe request frame in the dedicated frequency channel and receiving by the station a probe response frame in the dedicated frequency channel.

According to another aspect of the present disclosure, a method for wireless communication is provided, the method including allocating a first frequency channel in a frequency band, allocating a second frequency channel in a frequency band, transmitting by a station a probe request frame in the first allocated frequency channel, receiving by a station a probe response frame in the first allocated frequency channel, transmitting by a station a data frame in the second allocated frequency channel and receiving by a station a data frame in the second allocated frequency channel.

According to another aspect of the present disclosure, a method for wireless communication is provided, the method including dedicating a frequency channel in a frequency band, determining by an access point the dedicated frequency channel, receiving by the access point a probe request frame in the dedicated frequency channel, transmitting by the access point a probe response frame in the dedicated frequency channel.

BRIEF DESCRIPTION OF THE DRAWINGS

The above and other aspects, features and advantages of the present disclosure will become more apparent by describing in detail embodiments thereof, taken in conjunction with the accompanying drawings in which.

DETAILED DESCRIPTION

Figure 1:
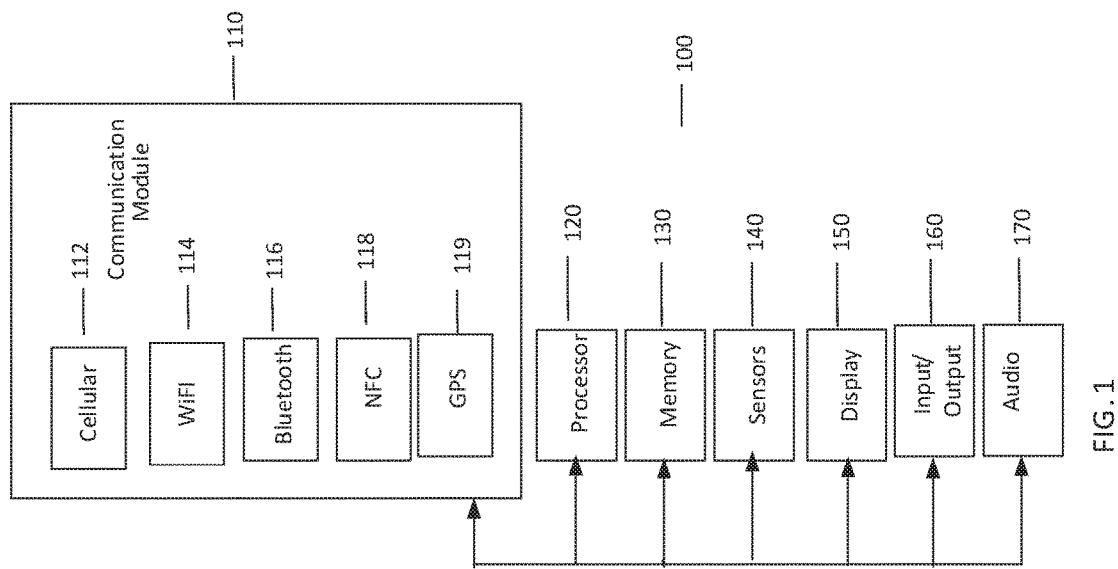
FIG. 1 is a schematic block diagram of a wireless communication device, according to an embodiment of the present disclosure.

The present disclosure now will be described more fully hereinafter with reference to the accompanying drawings, in which embodiments of the disclosure are shown. This disclosure may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like reference numbers refer to like elements throughout. It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another. For example, a first signal could be referred to as a second signal, and, similarly, a second signal could be referred to as a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having meanings that are consistent with their meaning in the context of the relevant art and/or the present description, and will not be interpreted in an idealized or overly formal sense unless expressly so defined herein.

Each of the components of the wireless communication device according to an embodiment of the present disclosure may be implemented by one or more components and the name of the corresponding component may vary depending on the type of wireless communication device. In various embodiments of the present disclosure, the wireless communication device may include at least one of the above-described elements. Some of the above-described elements may be omitted from the wireless communication device, or the wireless communication device may further include additional elements. Further, some of the components of the wireless communication device according to the various embodiments of the present disclosure may be combined to form a single entity, and thus, may equivalently execute functions of the corresponding elements prior to the combination.

The term "module" as used herein may, for example, mean a unit including one of hardware, software, and firmware or a combination of two or more of them. The "module" may be interchangeably used with, for example, the term "unit", 'block', "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which is known or are to be developed hereinafter.

According to various embodiments of the present disclosure, at least some of the devices (for example, modules or functions thereof) or the method (for example, operations or steps) according to the present disclosure may be implemented by a command stored in a computer-readable storage medium in a programming module form. When the command is executed by one or more processors, the one or more processors may execute a function corresponding to the command. According to an embodiment of the present disclosure a wireless communication device may have multiple processors within the device and within each functional module, for example a communication module. The computer-readable storage medium may be, for example, a memory 130.

FIG. 1 is a schematic block diagram of a wireless communication device 100 according to an embodiment of the present disclosure. The wireless communication device 100 includes a communication module 110, a processor 120, a memory 130, a plurality of sensors 140, a display 150, an input/output module 160 and an audio module 170.

The wireless communication device 100 includes the communication module 110 for connecting the wireless communication device 100 to a network for communication of voice and data. The communication module 110 provides wide area, local area, personal area, near field, short range and satellite communication. In particular, the cellular communication module 112 provides a wide area network connection through terrestrial base transceiver stations using technologies such as Long Term Evolution. The WiFi communication module 114 provides a local area network connection through network Access Points (APs) using technologies such as WiFi which are based on the IEEE802.11 and other standards. The WiFi communication module 114 may allow the wireless communication device to act as an Access Point (AP) or a station. The Bluetooth communication module 116 provides personal area direct and networked communication using technologies such as IEEE802.15. The Near Field Communications (NFC) module 118 provides point to point short range communication using standards such as ISO/IEC 14443. The GPS module 119 provides for receiving Global Navigation Satellite Signals (GNSS) in order to compute the device's absolute position and also provides an accurate timing reference signal for use as an external timing signal.

The processor 120 provides application layer processing functions required by the user of the wireless communication device 100. The processor 120 also provides command and control functionality for the various modules in the wireless communication device 100.

The memory module 130 provides storage for device control program code, user data storage, application code and data storage.

The sensor module 140 may contain physical sensing devices for sensing physical conditions internal and external to the wireless communication device 100. The sensor module 140 may also contain electronic conditioning circuits and software control for manipulating sensor data and making it available to the other modules in the wireless communication device 100.

According to an embodiment of the present disclosure, a method is presented for dedicating a frequency channel to probe request frames and probe response frames. According to another embodiment of the present disclosure, a method is presented for transmitting probe request frames and probe response frames on frequency channels other than frequency channels allocated for data frames.

A WiFi local area network allows multiple wireless communication devices to communicate with a network using radio waves. In a WiFi system a Basic Service Set (BSS) is a set of stations that communicate with one another. When a BSS includes an Access Point (AP) with a network connection, the BSS is called an infrastructure BSS. Within a BSS when a station (as an example, a wireless communication device) attempts to connect to an AP, the connection process includes a probe request frame to be transmitted from the wireless communication device to an AP or multiple APs. The APs may respond to the probe request frame with a probe response frame. The IEEE 802.11 standard for wireless communication defines the timing and content of the probe request frames and the probe response frames. The probe request frame includes the Service Set IDentity (SSID) of a particular AP or a "wildcard" which is broadcast to all APs in the area, and information regarding the capabilities of the wireless communication devices WiFi controller is also included in the probe request frame. In the infrastructure BSS, the AP will always respond to probe request frames with probe response frames. The probe response frame contains nearly all the same information as a beacon frame and includes the timestamp, beacon frame interval, and capability information fixed fields. It also includes the SSID, supported rates, one or more PHY parameter sets, the optional contention-free parameter set, and the optional IBSS parameter set.

In order for a station to communicate with an AP in an infrastructure BSS, it must first find the APs. The process of finding an AP is scanning. Scanning may be either passive or active. Active scanning requires the scanning station to transmit probe request frames to APs and receive probe response frames from APs. Active scanning allows much faster network connections as compared to passive scanning.

In an embodiment of the present disclosure, a separate frequency channel is dedicated for the transmission of the probe request frames and probe response frames from the data frames. Transmitting the probe request frames and probe response frames on a separate dedicated frequency channel frees up additional bandwidth on the frequency channel allocated to data frames. In a public WiFi system, a significant amount of traffic is generated by probe request frames and probe response frames as many stations are attempting to gain access to the network at the same time. As there are a limited number of frequency channels assigned by regulating agencies such as the Federal Communications Commission (FCC in the United States) to WiFi traffic, choosing which frequency channel to assign as a dedicated frequency channel for probe request frames and probe response frames may be different for each country. In addition, the assignment of the dedicated frequency channel may be a function of the frequency band.

Figure 4:
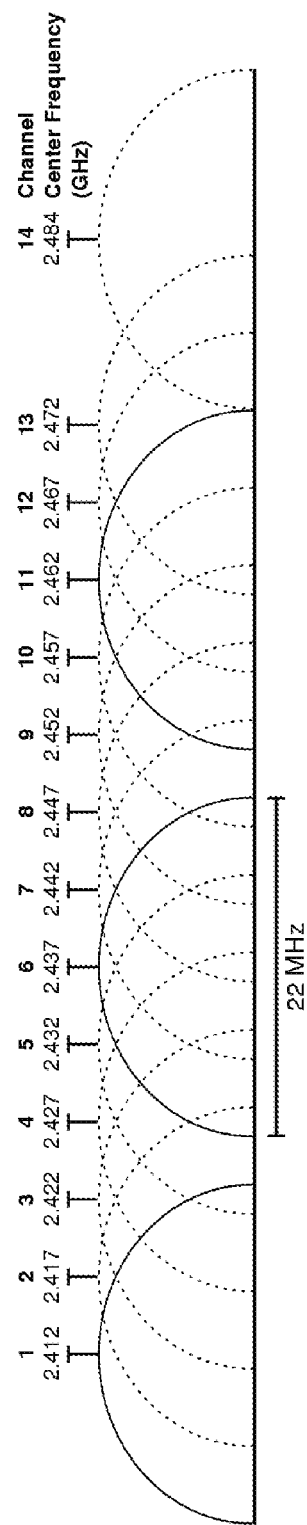
FIG. 4 is a diagram illustrating frequency channel numbers and frequency assignments for a WiFi system according to an embodiment of the present disclosure.

As shown in FIG. 4 there are 14 overlapping frequency channels in the 2.4 GHz band. In an embodiment of the present disclosure, frequency channel number 14 may be dedicated to the probe request frames and probe response frames in countries such as Japan where frequency channel 14 is prohibited from carrying high data rate transmissions (as an example, Orthogonal Frequency Division Multiplexing). WiFi typically requires 20 MHz of bandwidth and also requires the frequency channels to be non-overlapping. Therefore, as shown in FIG. 4, frequency channels 1, 5 and 9 may be used for data frames and frequency channel 13 may be dedicated to the probe request frames and probe response frames. In the U.S., only frequency channels 1, 6 and 11 are allowed for use in WiFi systems, therefore selecting any one of those frequency channels as the dedicated probe request frame and probe response frame frequency channel will allow 2 other frequency channels to be available for transmitting data frames.

WiFi may also operate in the 5 GHz band. In the 5 GHz band, frequency channel 116 may be dedicated to the probe request frames and probe response frames as frequency channel 16 may not be appropriate for data frame transmission due to its proximity to the weather radar band. In an embodiment of the present disclosure, WiFi may operate in both the 2.4 GHz band and the 5 GHz band simultaneously. For example, a frequency channel in the 2.4 GHz band may be dedicated or temporarily allocated to the probe request frames and probe response frames while the data frames are transmitted in the 5 GHz band. In another embodiment of the present disclosure, both the 2.4 GHz band and the 5 GHz band may operate simultaneously while a frequency channel in the 5 GHz band may be dedicated or temporarily allocated to the probe request frames and probe response frames while the data frames are transmitted in the 2.4 GHz band. In an embodiment of the present disclosure, frequency channels dedicated to the transmission of probe request frames and probe response frames may simultaneously operate in both the 2.4 GHz and 5 GHz bands to support APs or stations using either band.

In an embodiment of the present disclosure, the probe request frames and probe response frames may not be exclusively dedicated to a single frequency channel. Overall gains in bandwidth may also be obtained by directing the majority of probe request frame traffic and probe response frame traffic to a single frequency channel while directing the majority of the data frame traffic to frequency channels which are not dedicated as the probe request frame and probe response frame frequency channel.

In an embodiment of the present disclosure, determining the frequency channel dedicated to the probe request frames and probe response frames may be a function of the location of the AP and the station. Allocation of frequency bands and rules for the use of frequency channels in those frequency bands is often performed on a country wide or regional basis and is generally determined by a regulatory government agency (for example, the FCC in the U.S.). As different countries may have different rules for each of the frequency bands, in an embodiment of the present disclosure, the access point and the station may determine which frequency band to dedicate to probe request frames and probe response frames based on which country the AP and station are located. The AP or station may determine their location by a GPS module 119 measurement, WiFi 114 positioning methods or terrestrial cellular based 112 positioning methods. When the AP or station powers up or when the WiFi radio is enabled in the AP or station, it may perform a location determining procedure using one of the methods indicated above. Upon determining the location, the AP or station may refer to a table stored in memory 130 which indicates the frequency channel dedicated to probe request frames and probe response frames for the current location.

Particular stations may be unable to determine their location due to lack of a location determining method being available in the station. For example, the station may not have a GPS module 119 or a cellular module 112 or other location determining method. In this case, the dedicated frequency channel for probe request frames and probe response frames may be identified through a passive scanning method. In a passive scanning method, the station listens on each frequency channel for beacon frames and probe response frames (i.e. probe response frames resulting from APs processing other stations' probe request frames) which are sent periodically by an AP. A passive scan generally takes more time, since the station must listen and wait for a beacon frame versus actively probing to find an AP. The beacon frames and probe response frames received through passive scanning are buffered and used to decode and extract information about BSSs. The station performing the passive scanning may decode the information elements in the beacon frames and probe request frames and determine the frequency channel that has been dedicated to the probe request frames and probe response frames. After decoding and storing the information indicating the frequency channel dedicated to probe request frames and probe response frames, the station may begin using the dedicated frequency channel for transmitting probe request frames to the APs and receiving probe response frames. In an embodiment of the present disclosure, the passive scanning process may be accelerated in time by shortening the beacon frame interval period on the dedicated frequency channel. Since the dedicated frequency channel is not carrying data frame traffic there is more bandwidth to allow more frequent beacon frames to be transmitted, thereby shortening the beacon frame interval period.

In a WiFi network access system and particularly in a public WiFi access system, there may be many legacy stations accessing the network with different versions of WiFi, for example 802.11a, 802.11b, 802.11g, 802.11n, 802.11ac, or a combination thereof. These legacy stations may have their software and firmware updated over time to include the programs and routines required for conforming to the methods described in the present disclosure for using a dedicated frequency channel for probe request frames and probe response frames. In an embodiment of the present disclosure, the impact of legacy stations transmitting probe request frames and probe response frames on frequency channels other than the dedicated frequency channel may be reduced by certain methods disclosed herein. Among the methods for reducing the impact are delaying the probe response frames from the AP to the legacy station and aggregating probe response frames by accumulating probe requests from legacy stations in the AP and responding to a group of probe request frames by sending a single probe response frame to the group of legacy stations.

In an embodiment of the present disclosure, legacy stations will be prevented from executing the association process with APs on the dedicated frequency channel by indicating that the data frames are on a different frequency channel by using the DS parameter set element as an indicator of the frequency channel to be used for data frames. The association process establishes a link between an access point and a wireless LAN station. In the 5 GHz band, the supported rates information element which is an information element as defined by the 802.11 standard, indicating a rate which is undefined in 802.11 as being mandatory may also prevent stations from attempting to associate on the frequency channel dedicated for probe request frames and probe response frames. In addition, switching to another frequency channel for association and data frame transfer may be indicated by using the Channel Switch/Extended Channel Switch procedures or BSS Transition procedures as defined by the IEEE 802.11 standard.

In an embodiment of the present disclosure, designation of the frequency channels dedicated to probe request frames and probe response frames and the frequency channels allocated to data frame traffic may be indicated by modifying existing information elements in the beacon frames or probe response frames or may be indicated in a new information element field within the beacon frames or probe response frames. The frequency channels dedicated to probe request frames and probe response frames and the frequency channels allocated to data frame traffic may be in separate frequency bands. For example, if the dedicated frequency channel for the probe request frames and probe response frames is in the 2.4 GHz band, the frequency channels allocated to the data frames may be in the 5 GHz band. Multiple frequency channels may be allocated for data frame traffic as indicated within modified existing information elements in the beacon frames or probe response frames or in a new information element field within the beacon frames or probe response frames. The multiple frequency channels allocated for data frame traffic may operate simultaneously increasing user bandwidth. In addition, multiple frequency channels may be dedicated in multiple bands (for example, 2.4 GHz and 5 GHz) for probe request frames and probe response frames.

In an embodiment of the present disclosure, the dedicated frequency channel for the probe request frames and probe response frames may have a different bandwidth than the frequency channels allocated for the data frame traffic. For example, if the dedicated frequency channel for the probe request frames and probe response frames has a bandwidth of 10 MHz, the frequency channels allocated to the data frame traffic may have a bandwidth of 20 MHz, 40 MHz, or 80 MHz. Therefore, separate the frequency channels allocated to the data frame traffic may have a wider bandwidth than the dedicated frequency channel for the probe request frames and probe response frames. As a result of this overall optimization of frequency band management, users may have more bandwidth available for data frame traffic.

Figure 2:
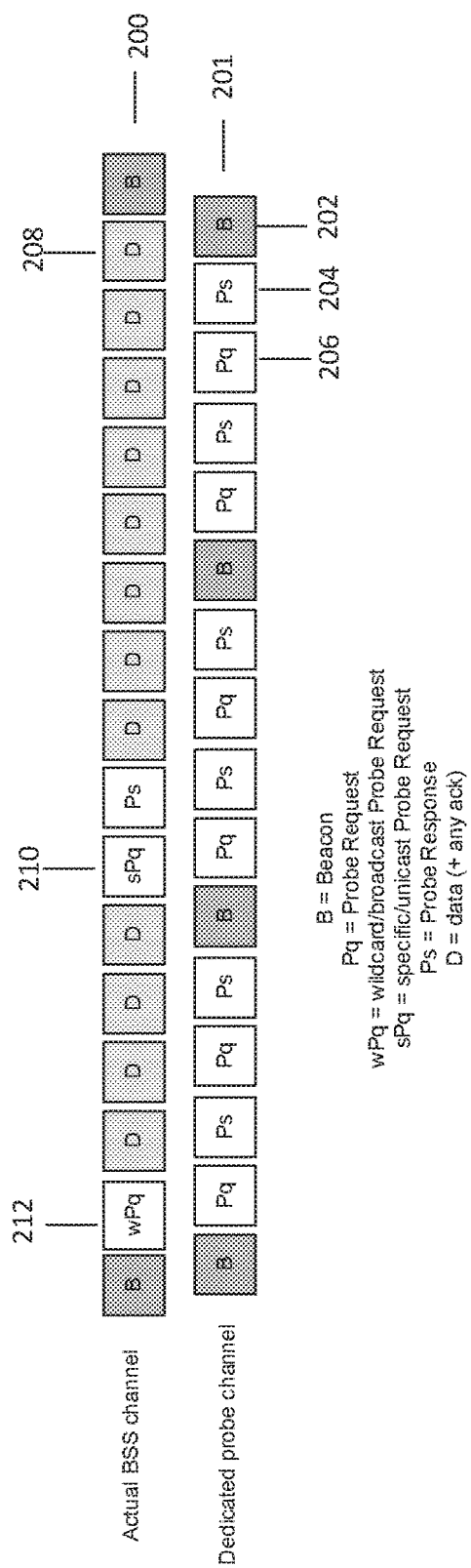
FIG. 2 is a diagram illustrating a sequence of control and data frames in dedicated frequency channels in a WiFi system according to an embodiment of the present disclosure.

FIG. 2 is a diagram illustrating a sequence of control and data frames in separate frequency channels in a WiFi system. As shown in FIG. 2, the dedicated probe request frames and probe response frames frequency channel 201 operates in parallel with the actual BSS channel 200 according to an embodiment of the present disclosure. On the dedicated probe request frame and probe response frame frequency channel 201, beacon frames 202 are sent more often than on the actual BSS channel 200. The traffic on the dedicated probe request frame and probe response frame frequency channel is primarily consumed by probe request frames 206 and probe response frames 204.

On the actual BSS channel 200, specific/unicast probe request frames 210 transmitted by the station 100 to a specific SSID (which is not very common in the case of public network access) are responded to by the APs with a probe response frame, but wildcard/broadcast probe request frames 212 which are transmitted by the station 100 to all APs within a specific range are ignored by the APs. The traffic on the actual BSS channel channel 200 is primarily consumed by data frames 208.

In an alternative embodiment of the present disclosure, rather than having a frequency channel dedicated to probe request frames and probe response frames as described above, there may be a frequency channel dedicated to data frames. An AP may transmit beacon frames and probe request frames and probe response frames on one frequency channel, and support any data frame activity on that frequency channel. The AP would also support a second frequency channel for data frames for stations that support the dedicated frequency channel. The AP may not transmit beacon frames, probe request frames or probe response frames on the second frequency channel. The beacon frame information required for operation of the frequency channel dedicated to data frames may be provided in an alternative frame format.

Figure 3:
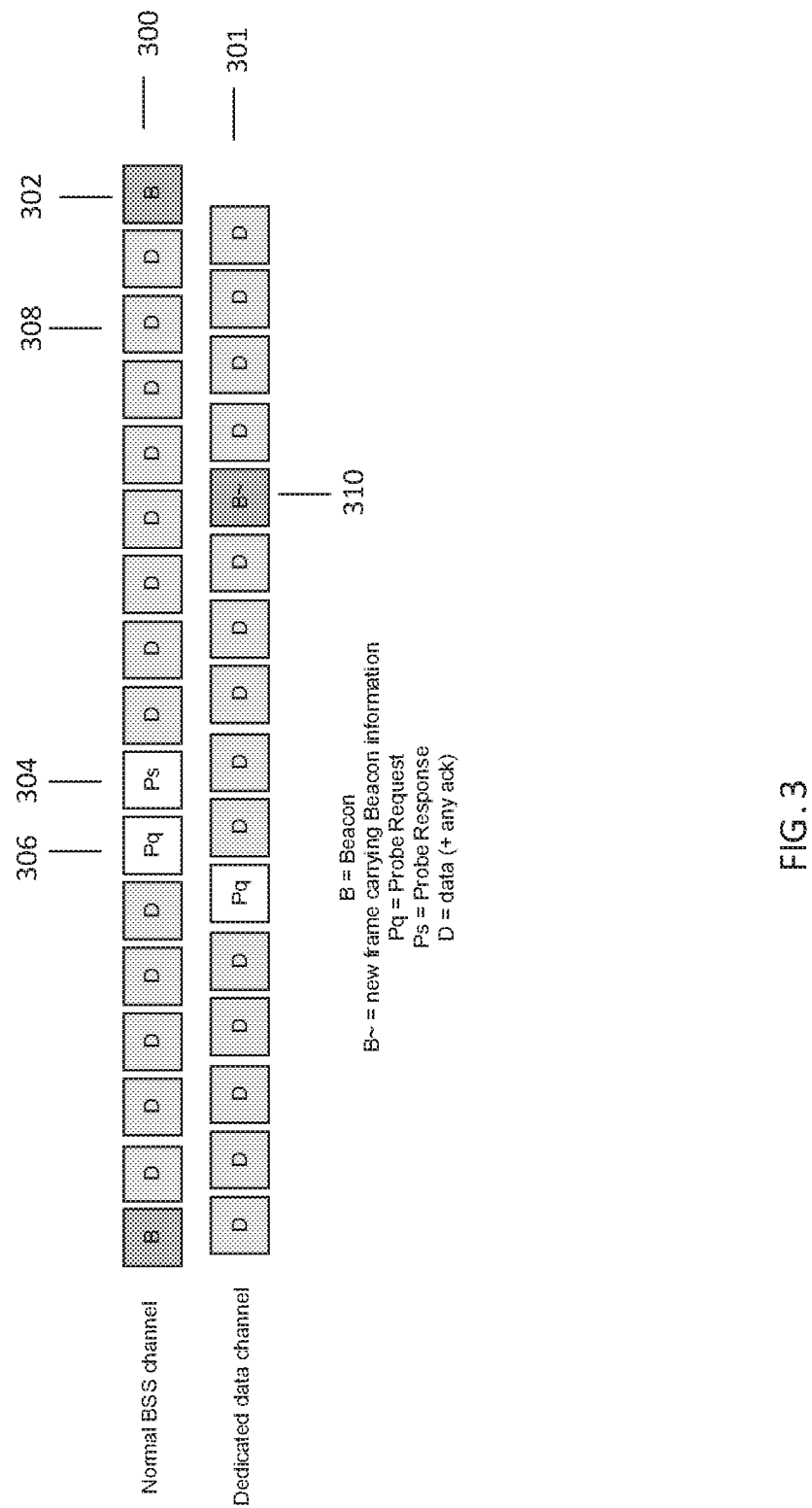
FIG. 3 is a diagram illustrating another sequence of control and data frames in dedicated frequency channels in a WiFi system according to an embodiment of the present disclosure.

FIG. 3 is a diagram illustrating another sequence of control and data frames in separate frequency channels in a WiFi system according to an embodiment of the present disclosure. As shown in FIG. 3, on the normal (legacy) frequency channel 300, beacon frames 302 are sent as usual, and probe request frames 306 are responded to as usual with probe response frames 304. The normal (legacy) frequency channel 300 may also carry data frames 308. On the dedicated data frame frequency channel 301, beacon frames 302 are not sent, although a new frame type carrying beacon frame information 310 is transmitted periodically and any probe request frames 306 transmitted to the AP are ignored. The dedicated data frame frequency channel 301 is primarily consumed by data frames 308. In another embodiment of the present disclosure, the dedicated data frame frequency channel 301 only carries data frames and control frames necessary for beamforming, requiring the stations to transmit and receive on both the dedicated data frame frequency channel 301 and the normal (legacy) frequency channel 300.

While the present disclosure has been particularly shown and described with reference to certain embodiments thereof, it will be understood by those of ordinary skill in the art that various changes in forms and details may be made therein without departing from the spirit and scope of the present invention as defined by the following claims and their equivalents.

What is claimed is:

1. A method for wireless communication, the method comprising:
dedicating a frequency channel in a frequency band;
determining, by a station, the dedicated frequency channel by decoding, by the station, an information element within a beacon frame;
transmitting, by the station, a probe request frame in the dedicated frequency channel based on the beacon frame;
receiving, by the station, a probe response frame in the dedicated frequency channel,
wherein a separate frequency channel from the dedicated frequency channel is in the frequency band and is allocated for transmitting data frames upon receiving the probe response frame,
wherein the beacon frame in the dedicated frequency channel is transmitted more often than the beacon frame in the separate frequency channel,
wherein the dedicated frequency channel and the separate frequency channel are allocated by decoding, by the station, the information element within the beacon frame, and
wherein the information element indicates the dedicated frequency channel dedicated to the probe request frame and the probe response frame, and indicates the separate frequency channel.

2. The method of claim 1, wherein the dedicated frequency channel is determined by a location of the station and a frequency channel code stored in a memory of the station.

3. The method of claim 1, wherein the dedicated frequency channel is in the 2.4 GHz band or the 5 GHz band.

4. The method of claim 1, wherein a bandwidth of the separate frequency channel allocated for transmitting data frames is wider than the dedicated frequency channel.

5. A method for wireless communication comprising:
allocating a first frequency channel in a first frequency band;
allocating a second frequency channel in a second frequency band;
transmitting, by a station, a probe request frame in the first allocated frequency channel based on a beacon frame;
receiving, by the station, a probe response frame in the first allocated frequency channel;
transmitting, by the station, a first data frame in the second allocated frequency channel, upon receiving the probe response frame;
receiving, by the station, a second data frame in the second allocated frequency channel,
wherein the first allocated frequency channel and the second allocated frequency channel are allocated by decoding, by the station, an information element within the beacon frame,
wherein the information element indicates the first allocated frequency channel dedicated to the probe request frame and the probe response frame, and indicate sthe second allocated frequency channel, and
wherein the beacon frame in the first allocated frequency channel is transmitted more often than the beacon frame in the second allocated frequency channel.

6. The method of claim 5, wherein the first allocated frequency channel and the second allocated frequency channel are allocated by determining a location of the station and a first allocated frequency channel code and a second allocated frequency channel code stored in a memory of the station.

7. The method of claim 5, wherein the first allocated frequency channel and the second allocated frequency channel are both in the 2.4 GHz band or the 5 GHz band.

8. The method of claim 5, wherein the first allocated frequency channel is in the 2.4 GHz band and the second allocated frequency channel is in the 5 GHz band.

9. The method of claim 5, wherein the first allocated frequency channel is in the 5 GHz band and the second allocated frequency channel is in the 2.4 GHz band.

10. The method of claim 5, wherein a bandwidth of the first allocated frequency channel is wider than the second allocated frequency channel.

11. A method for wireless communication comprising:
dedicating a frequency channel in a frequency band;
determining, by an access point, the dedicated frequency channel by decoding, by the access point, an information element within a beacon frame;
receiving, by the access point, a probe request frame generated based on the beacon frame in the dedicated frequency channel; and
transmitting, by the access point, a probe response frame in the dedicated frequency channel,
wherein a separate frequency channel from the dedicated frequency channel is in the frequency band and is allocated for transmitting data frames, upon transmitting the probe response frame,
wherein the beacon frame in the dedicated frequency channel is transmitted more often than the beacon frame in the separate frequency channel,
wherein the dedicated frequency channel and the separate frequency channel are allocated by decoding, by the station, the information element within the beacon frame, and
wherein the information element indicates the dedicated frequency channel dedicated to the probe request frame and the probe response frame, and indicates the separate frequency channel.

12. The method of claim 11, wherein the dedicated frequency channel is determined by a location of the access point and a frequency channel code stored in a memory of the access point.

13. The method of claim 11, wherein the dedicated frequency channel is in the 2.4 GHz band or the 5 GHz band.

* * * * *